Aug. 3, 1943.                J. G. CAPSTAFF                2,326,007
                              SENSITOMETRY
                          Filed Nov. 6, 1941           6 Sheets-Sheet 1

JOHN G. CAPSTAFF
INVENTOR

BY

ATTORNEY

Aug. 3, 1943.   J. G. CAPSTAFF   2,326,007
SENSITOMETRY
Filed Nov. 6, 1941   6 Sheets-Sheet 2

JOHN G. CAPSTAFF
INVENTOR
BY
ATTORNEY

Aug. 3, 1943. J. G. CAPSTAFF 2,326,007
SENSITOMETRY
Filed Nov. 6, 1941 6 Sheets-Sheet 3

JOHN G. CAPSTAFF
INVENTOR
BY *Newton M. Parsons*
ATTORNEY

Aug. 3, 1943.   J. G. CAPSTAFF   2,326,007
SENSITOMETRY
Filed Nov. 6, 1941   6 Sheets-Sheet 4
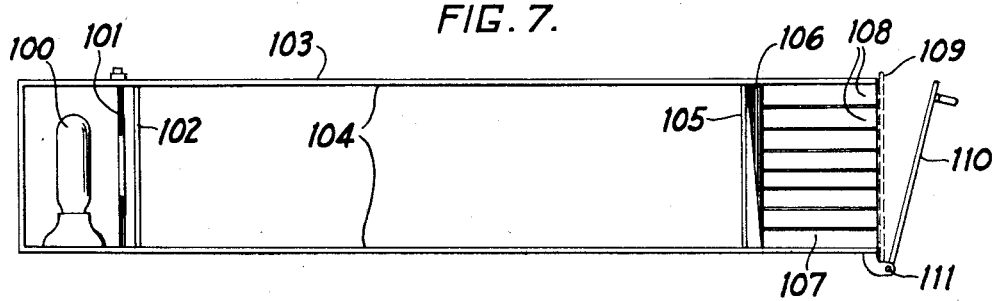
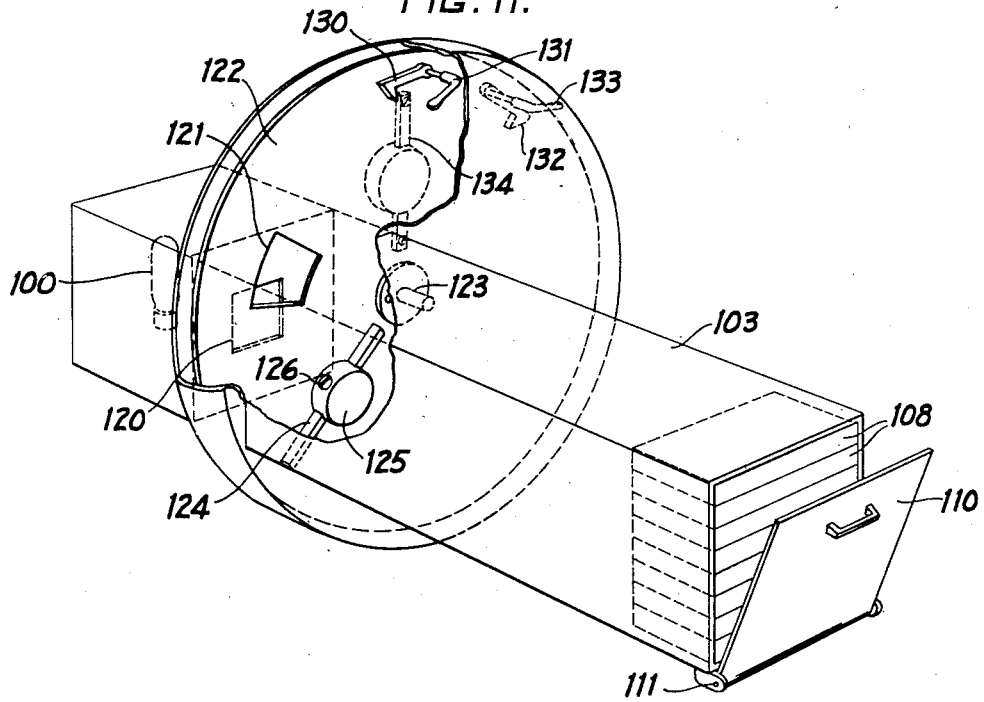
JOHN G. CAPSTAFF
INVENTOR
BY
ATTORNEY Aug. 3, 1943.  J. G. CAPSTAFF  2,326,007
SENSITOMETRY
Filed Nov. 6, 1941  6 Sheets-Sheet 5
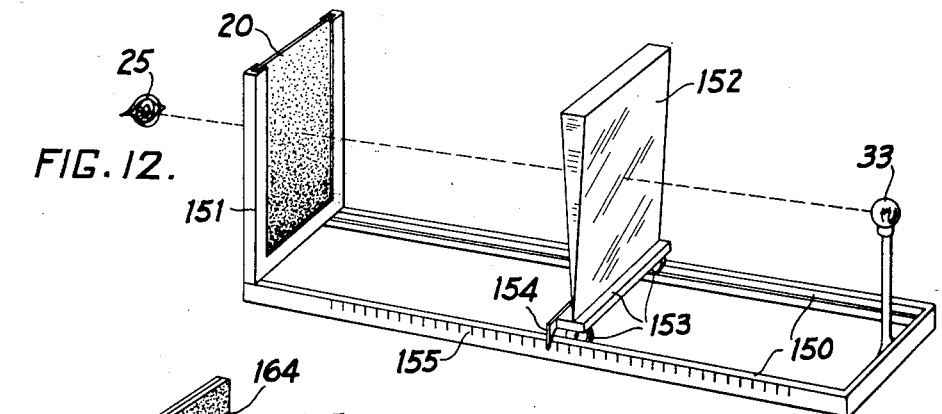
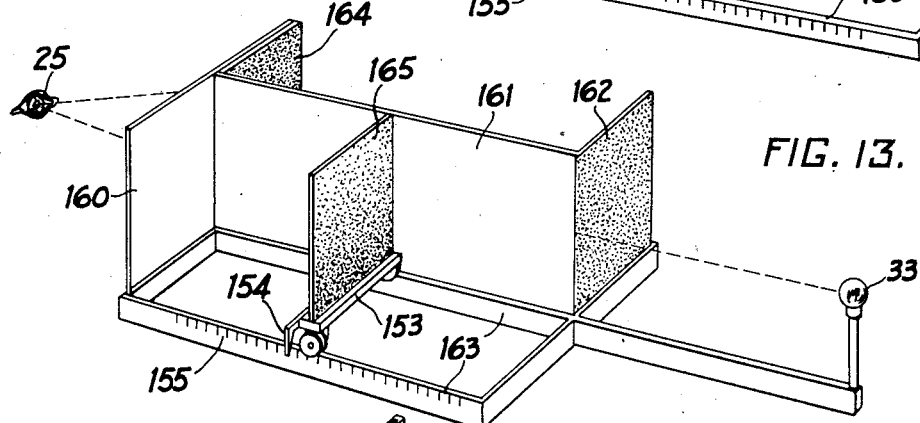
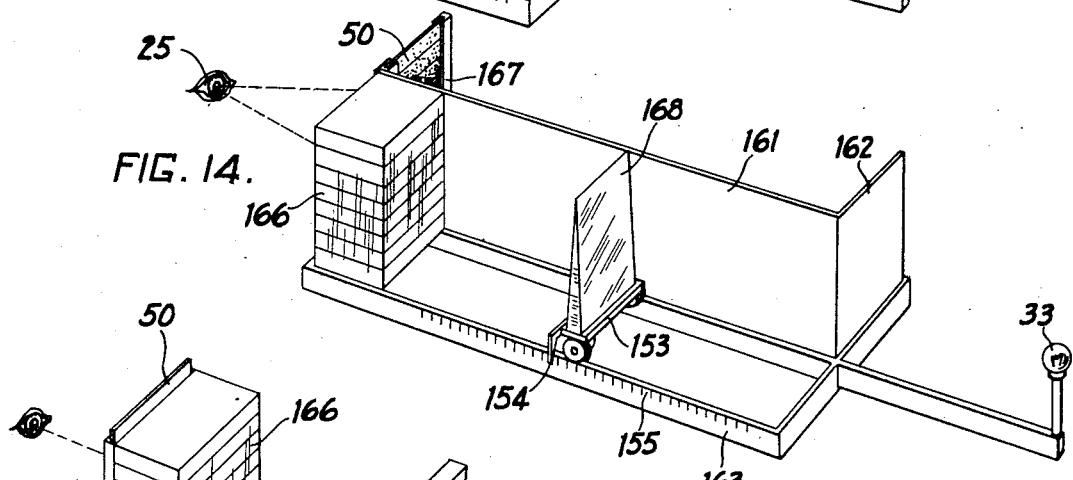
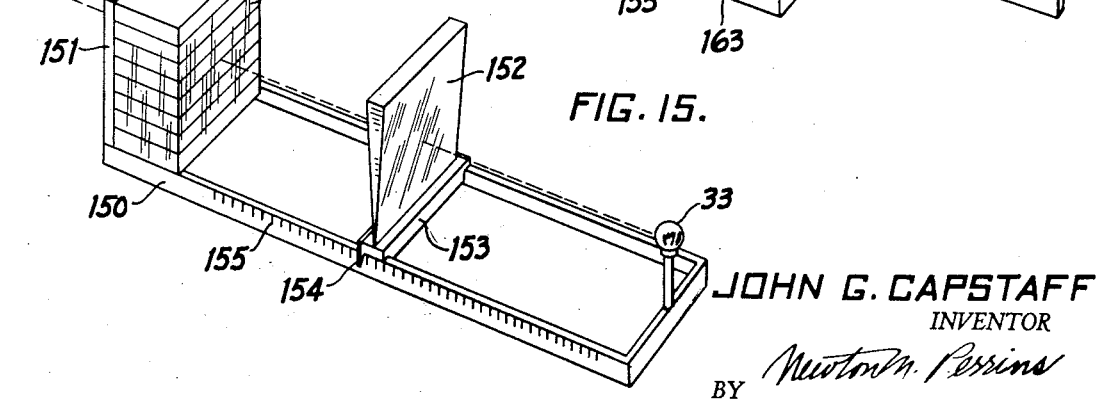
JOHN G. CAPSTAFF
INVENTOR
BY Newton M. Perkins
ATTORNEY Aug. 3, 1943.  J. G. CAPSTAFF  2,326,007
SENSITOMETRY
Filed Nov. 6, 1941  6 Sheets-Sheet 6

JOHN G. CAPSTAFF
INVENTOR

BY *Newton M. Perrins*
ATTORNEY

Patented Aug. 3, 1943

2,326,007

UNITED STATES PATENT OFFICE 2,326,007

SENSITOMETRY

John G. Capstaff, Rochester, N. Y., assignor to Eastman Kodak Company, Rochester, N. Y., a corporation of New Jersey Application November 6, 1941, Serial No. 418,052

22 Claims. (Cl. 88—14)

This invention relates to sensitometry and particularly to instruments for measuring photographic gamma.

It is the primary object of the invention to provide a meter for determining gamma rapidly and accurately from a sensitometric strip. In one embodiment of the invention, the sensitometric strip is of the type in which the gradation in density is in steps.

It is also an object of one embodiment of the invention to provide an instrument which permits accurate and rapid determination of both gamma and photographic speed.

The preferred embodiment of the invention has as a subcombination light beam producing means whose purpose it is to produce a light beam with accurately graduated intensity in which the gradation is preferably in steps. This sub-combination is also useful in other sensitometric instruments such as sensitometers.

According to the invention a gamma meter is made up with a viewing field in which the intensity of two independent graded intensity light beams can be matched either for equality or for summation to a uniformity of intensity across the beams. The viewing field may be defined as in any photometric instrument by suitable diaphragming means and/or by a diffusing surface such as ground glass. This viewing field is illuminated by light transmitted through or reflected from a sensitometric strip of graded density, the gradation being in steps in the preferred embodiment of the invention. A sensitometric strip is a sample of the photosensitive material to be tested which has been exposed in a sensitometer and processed either by standard methods or by methods whose effect is to be tested. The same or a different portion of a field is illuminated by a standard light beam of graded intensity which according to the invention is controlled by having a density wedge in front of a small source of light and having the wedge axially adjustable (i. e. along the light beam) to vary the rate of gradation of the intensity of said beam at the viewing field. As the wedge is moved nearer to the light source, the shadow of the wedge spreads out over a greater area and that portion of it striking the field has a reduced rate of gradation. Density wedges do not necessarily vary in physical thickness, but do vary continuously in optical density.

In one species of the invention, the wedge is oriented in the same direction optically as the sensitometric strip and the portions of the viewing field being compared are adjacent to one another. It is desirable to have the overall average intensity of the two portions of the field variable relative to one another so that they can be matched both in intensity and in rate of gradation. The axial adjustment of the wedge when the rates of gradation of the two field portions are equal, is a direct measure of the gamma of the sensitometric strip and a scale is provided on the wedge to give this gamma directly.

If the sensitometric strip can be moved transversely of the illuminating beam, this constitutes a means of controlling the overall average intensity of the portion of the viewing field receiving light from the strip. If the strip is graded in steps, the change in intensity must be by a whole step and, hence, additional control of the intensity must be provided to give intensities intermediate to whole steps. The intensity of the standard beam, may be varied by shifting the wedge transversely of the light passing therethrough or alternatively the intensity of the light sources may be varied as by a rheostat. Any transverse shift of the wedge or of the strip must be along the direction of density gradation (or have a component in that direction) if it is to effect the total or average intensity. If the transverse shift were entirely "sideways" there would be no effect (until the light beam was uncovered).

Whatever method is used for varying the relative intensity of the two portions of the field, a scale is provided thereon to read directly the photographic speed of the sensitometric strip.

In another embodiment of the invention, the strip and wedge are oriented in optically opposite directions and the shadows thereof are superimposed in the viewing field. The wedge is adjusted axially until the viewing field has uniform overall density and a scale means on the wedge reads the gamma of the sensitometric strip directly, as before. Thus in the former case the rates of gradation were matched by being made to appear the same while in this case they are matched by being made to add to overall uniformity. With the latter arrangement, there is no direct method of reading photographic speed, and therefore an additional standard uniformly intense portion is provided in the viewing field adjacent to the superposed portions. The adjustment of any device for varying the relative average or total intensities of these two portions after the superposed portions are made uniform, gives a direct measure of photographic speed. On the other hand even when the determination of speed is not necessary, the adjacent field is useful since it makes much easier the determination of when the superposed portions have uniform overall intensity.

The advantage of having the sensitometric strip graded in steps appears both in the making of the strips and in the measuring thereof. The discrete density steps are much easier to match in intensity than a continuously graded sensitometric strip. When one portion of the viewing field of the gamma meter is illuminated through a stepped sensitometric strip, the standard portion of the viewing field must also be illuminated by a light beam with the intensity accurately graduated thereacross. To provide this light beam and similarly to provide the exposing beam in the sensitometer for making the sensitometric strip, I prefer to use a pile of integrating plates of solid transparent material such as glass between the wedge and the viewing field. In the description, and the accompanying claims, the term integrating plate is used in the same optical sense as "integrating" sphere, since the purpose of the plate is to integrate all of the light entering one end and to transmit it through the other end uniformly distributed thereacross.

The advantages of this combination of a pile of integrating plates and a uniform density wedge lie in the fact that it is possible to make a light filter of continuously graded density very accurately, whereas it is not possible to make a similar filter of stepped density accurately or to cut apertures with similar accuracy except at unwarranted cost. The combination of a continuously graded density filter with a pile of integrating plates therefore gives a more accurate gradation of intensity in the light beam. For accuracy in the widths of the steps, the plates should all be cut from the same sheet of flat transparent material. Of course the plates could be of different thicknesses if similar plates were used in both the sensitometer and the gamma meter, and for special purposes this has some advantage but in general it is better to have all the steps equal in width and density interval. In a preferred embodiment, one or both ends of the pile of integrating plates may be made translucent. If the pile is cut across the grain and one part of it shifted relative to the other by one-half the thickness of one of the plates, the intensity of the portions of the light beam coming through the shifted part, will be intermediate to those through the unshifted plates. This will be apparent from a consideration of the effect of the combination of a continuously graded density filter and a pile of integrating plates. Similarly a very light filter placed over a portion of each plate, will produce in the light beam, portions of intermediate intensities and if the optical density of the additional uniform filter is equal to one-half of the logarithm of the ratio between intensities of consecutive steps of the light beam, the additional portions will be exactly intermediate in density to the portions which do not have the added filter. The combination of a small light source and an axially adjustable wedged filter between the source and the viewing field of a gamma meter is useful for producing a variable rate of gradation whether the pile of integrating plates is present or not.

Further objects and advantages of the invention will be apparent from the following description when read in connection with the accompanying drawings, in which:

Figs. 1, 2, 3, and 4 illustrate in perspective the optical elements of various forms of gamma meters incorporating the present invention.

Fig. 7 illustrates a sensitometer useful for making the sensitometric strips used in the gamma meters shown in Figs. 3 to 6.

Figs. 8, 9, and 10 are end views of the pile of integrating plates used for producing light beams of accurately graded intensity.

Fig. 11 is a perspective view partially cut away of an alternative embodiment of the sensitometer shown in Fig. 7.

Figs. 12, 13, 14 and 15 show various forms of simplified gamma meters employing the preferred features of the present invention.

Figure 16:
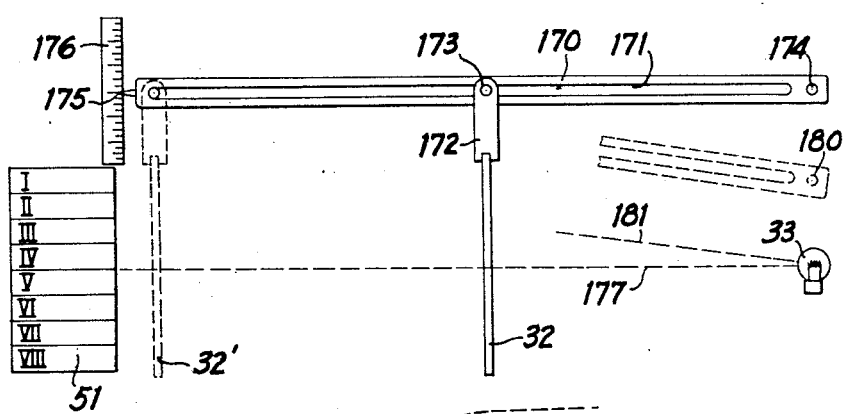
Figure 17:
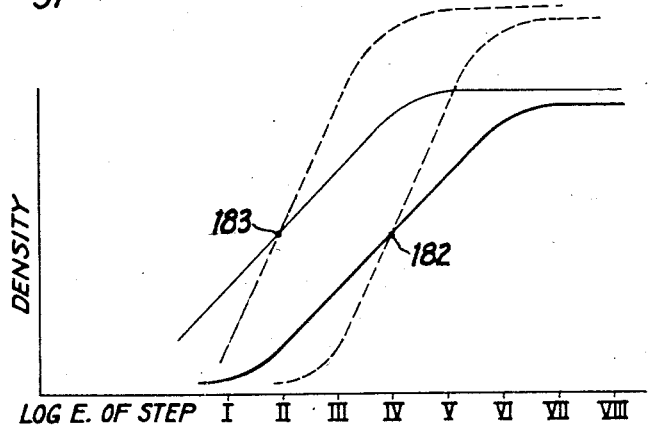

Figs. 16 and 17 show the principle of a preferred embodiment.

Figure 18:
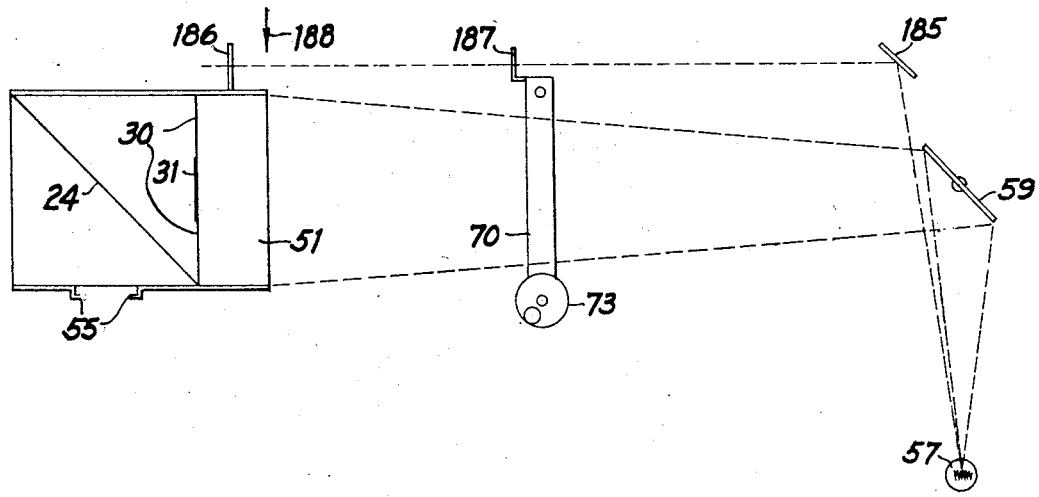

Fig. 18 shows one form of this embodiment.

Figure 1:
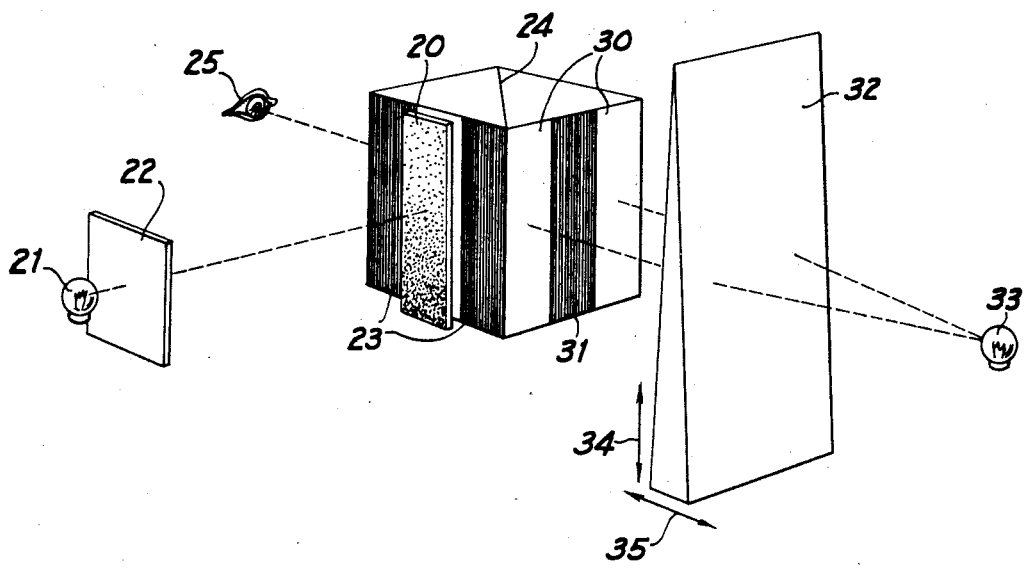
Figure 5:
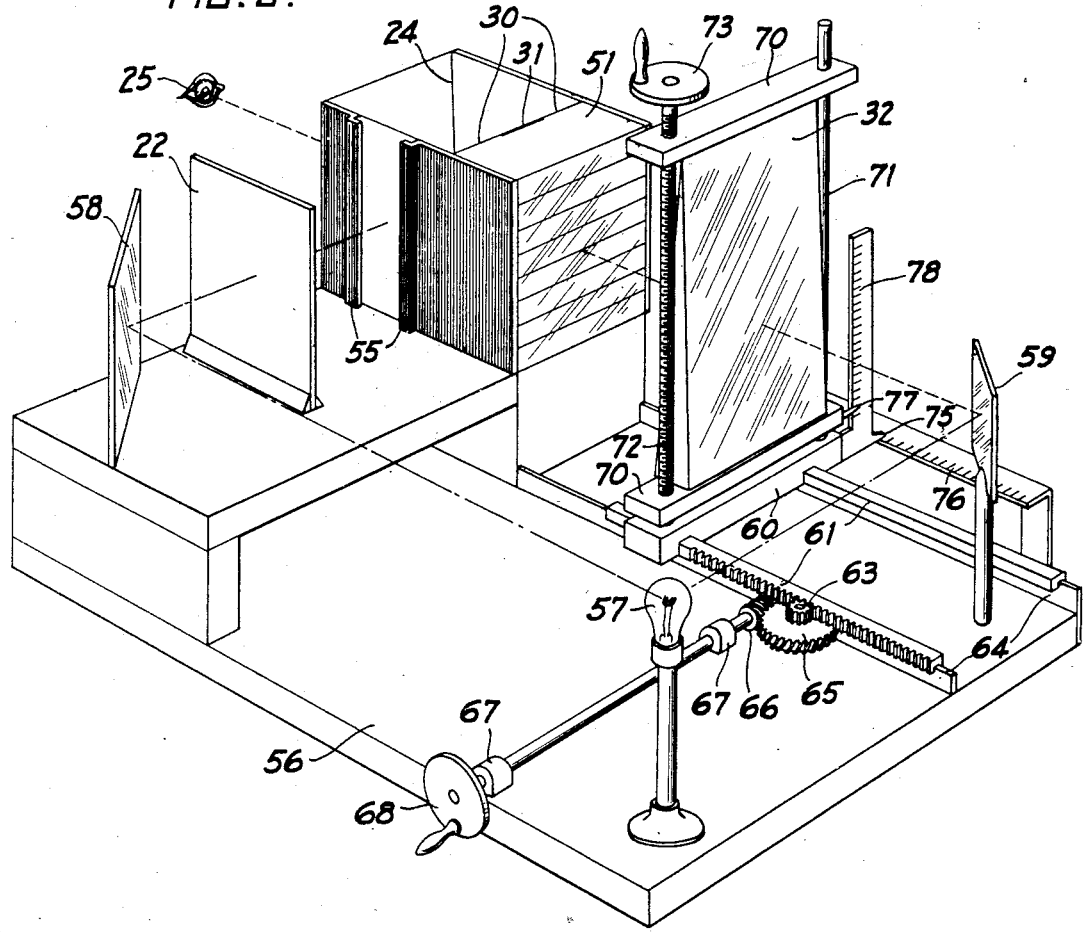
Fig. 5 shows in perspective, the preferred form of the embodiment shown in Fig. 3.

In Fig. 1 a sensitometric strip 20 of continuously graded density is illuminated by a light source 21 through a ground glass 22. On either side of the strip 20, which is actually in contact with the cube, but is shown spaced therefrom for clarity, are masks 23 painted on the surface of a glass cube of the Lummer-Brodhun type in which the viewing field 24 is located on a diagonal surface in the cube. Light from the sensitometric strip 20 is reflected by a central portion of the surface 24 to the eye 25 of an observer. The side portions of this surface are illuminated through clear areas 30 separated by a mask 31 which is complementary to the masks 23. These clear areas 30 receive light through a density wedge 32, which for clarity is shown as a physical wedge, but in general is just a film of varying density, from a light source 33. To eliminate any effects of variation in the light sources 21 and 33, they are preferably arranged as shown in Fig. 5 to consist of the same lamp, with suitable reflectors. However, they are shown separated in Fig. 1 for clarity. In the viewing field 24, the eye 25 sees two portions of graded intensity. As the wedge 32 is moved axially relative to the light beam therethrough as indicated by the double-headed arrow 35, the rate of gradation of the intensity of the beam through the portion 30 is varied and can be made to match the gradation in intensity of the light through the strip 20. For accurate matching of rates of gradation, it is preferable to have the overall average density of the two portions equal. For this purpose, the wedge 32 is made movable transversely of the beam as indicated by the double-headed arrow 34 along the direction of gradation of the wedge 32. As the wedge is pushed up the overall intensity of the light through the clear areas 30 is reduced because of the increasing density of the wedge. Similarly, the strip 20 could be moved or the intensity of the light sources 21 and 33 could be varied relative to one another. The adjustment axially of the wedge as indicated by the arrow 35 is a measure of the gamma of the sensitometric strip 20. The transverse adjustment of this wedge or of the strip, or the intensity adjustment of the light source is a measure of the overall density of the strip 20 and hence a measure of the photographic speed of this strip.

Figure 2:
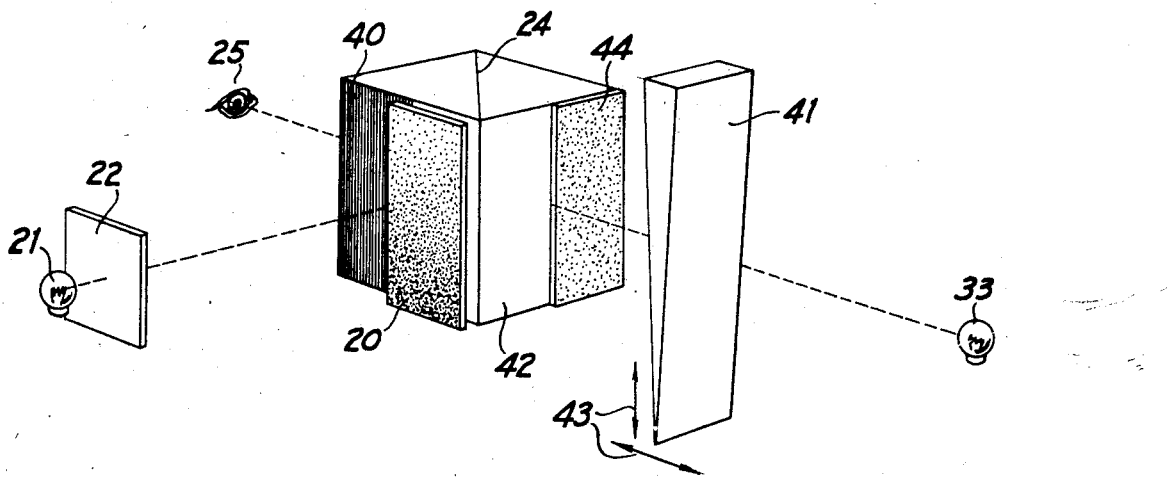

Fig. 2 similarly illustrates an alternative embodiment wherein the wedge 41 is oriented optically oppositely to the sensitometric strip 20, which in this case is masked by a single mask 40, When the wedge is adjusted axially, the rate of gradation of the intensity in the beam through the clear area 42 is varied until the overall intensity of the portion of viewing field 24 which receives light both through the strip 20 and the wedge 41 is made uniform. The axial adjustment of the wedge 41 is as before, a measure of the gamma of the sensitometric strip 20.

This latter arrangement has one great disadvantage; the rate of gradation of the strip and wedge must be linear in transparency rather than linear in density. Figs. 12 and 13 show simplified but less accurate gamma meters which overcome this disadvantage but still utilize matching by summation.

The matching of the rate of gradation of the two beams to give a uniform intensity across the field of view, is aided considerably if the adjacent portion of the field of view is illuminated through a uniform neutral density 44 having approximately the same intensity as that of the beam formed from the superposed beams. The adjustment of the wedge 41 is indicated by double-headed arrows 43. As before, transverse adjustment of the wedge 41 is a measure of the photographic speed of the sensitometric strip 20 if this wedge is adjusted until the sum of its effect and the effect of the strip 20 is a uniform field intensity equal to the intensity of the adjacent portion illuminated through the neutral density 44. Alternatively the wedge 41 may be prevented from transverse motion, the sources 21 and 33 held uniform at predetermined intensities, and the intensity of the light through the filter 44 varied to match that from the superposed portions of the field, the variation being a measure of the photographic speed of the strip 20. Or again the relative intensities of the lamps 21 and 33 may be varied. Thus the uniform field portion illuminated through the filter 44 serves two purposes namely increasing the ease with which gamma can be determined and measuring photographic speed.

Figure 3:
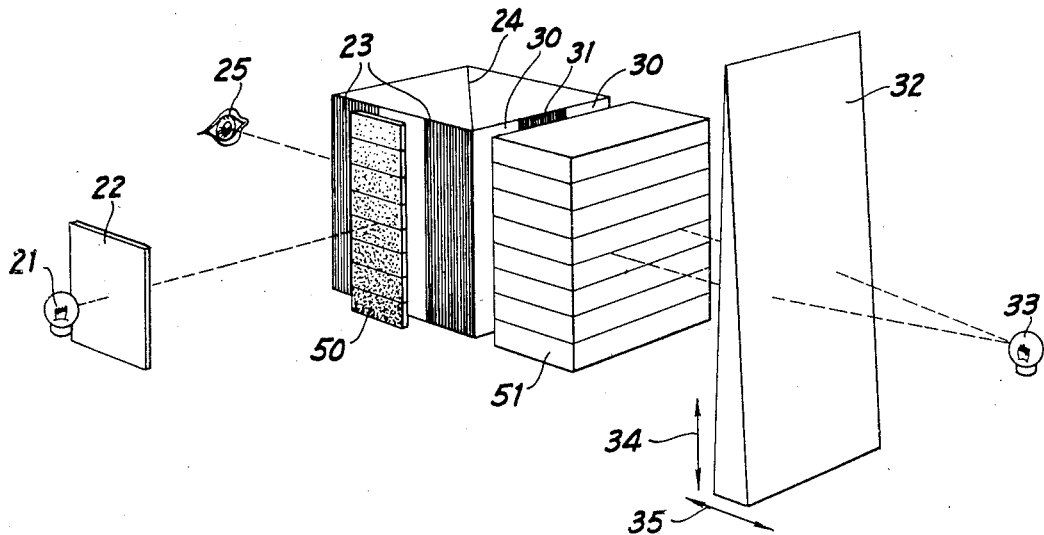
Figure 4:
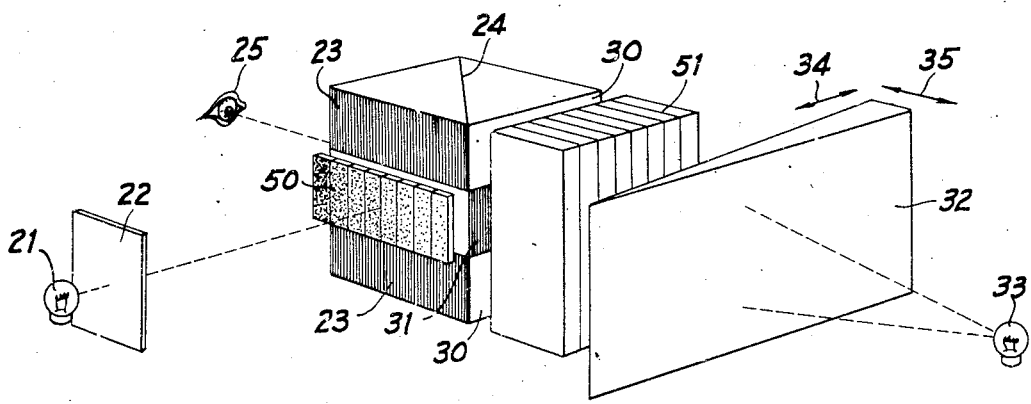

Fig. 3 may be compared with Fig. 1 and illustrates a preferred embodiment of the invention wherein the sensitometric strip 50 has the density gradation in steps. In this embodiment, the clear areas 30 are illuminated through a pile 51 of integrating plates which preferably but not necessarily have diffusing end surfaces. Plates 51 are immediately adjacent to the surfaces 30, but are shown separated for clarity. The light striking the clear areas 30 through any one of the plates is of uniform intensity and has an intensity which is the average of the intensity of the beam incident on that particular plate as controlled by the wedge 32. Fig. 4 is for practical purposes, identical with Fig. 3, but illustrates that it is the relative orientation of the two beams illuminating the viewing field that is important, not the physical orientation of the optical parts. In Fig. 4, the strip 50, the mask 23, the clear areas 30, the mask 31, the pile of plates 51 and the wedge 32 have all been turned on the side relative to the orientation shown in Fig. 3.

Fig. 5 is similar to Fig. 3 and shows some of the mechanical details thereof. In this figure grooves 55 are provided for holding the sensitometric strip. The whole apparatus is carried on a support 56 and light from a single lamp 57 is reflected by mirrors 58 and 59 to provide the illuminating beams for both portions of the field. The wedge 32 is mounted on vertically adjustable supports 70 carried on a base 60, which is fastened to carrier bars 61 mounted for axial movement on tracks 64. A pinion 63 engages a rack on one of the bars 61 and is driven by a worm gear 65 which is turned by a worm 66 mounted in bearings 67 and controlled by a handle 68. The axial adjustment of the wedge is indicated by a pointer 75 against the scale 76 carried on the support. The vertical adjustment of the wedge 32 is provided by screw 72 threaded through the supports 70 and turned by a crankwheel 73. The opposite ends of the supports 70 are guided by a shaft 71. The major portion of the average intensity control is provided by proper selection of the portion of the sensitometric strip to be measured; the vertical adjustment of the wedge 32 need only be very small. On the other hand, if the sensitometric strip is always positioned accurately in the grooves 55 the vertical adjustment of this wedge 32 is a measure of the photographic speed and the latter can be read off by a pointer 77 reading on a scale 78 carried by the base plate 60.

Figure 6:
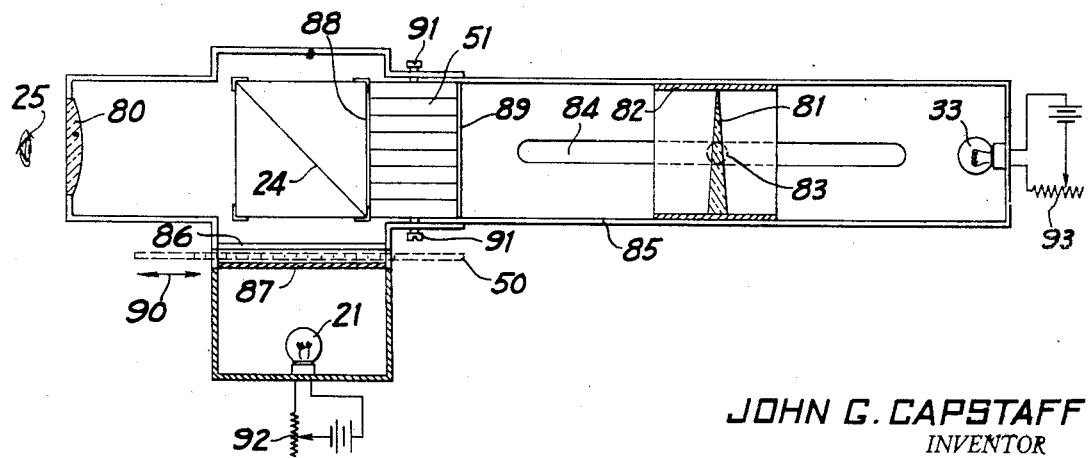
Fig. 6 shows a simplified form of gamma meter particularly useful when it is unnecessary also to measure the photographic speed of the sensitometric strip.

Fig. 6 shows a simplified form of gamma meter which is not particularly suitable for measuring photographic speed. In this embodiment, which corresponds to a top view of Fig. 4, the whole device is carried in a housing 85 provided with an eyepiece 80 for viewing the viewing field 24. The density wedge 81, again shown as a physical wedge for clarity, is carried in a tube 82 which is longitudinally adjustable in the housing 85 by a pin 83 extending through a slot 84 in the housing 85. The sensitometric strip 50 is held against a plate 86, the contacting surface of which may be diffusing, by a transparent pressure plate 87. The pile 51 of integrating plates is provided with very thin translucent sheets 88 and 89 at the ends thereof. In the operation of the device, the sensitometric strip 50 is adjusted as indicated by the double-headed arrow 90 until the intensity of the field of view 24 illuminated through this strip 50 has approximately the same average as that of the standard comparison portions of the field. Then the wedge 81 is adjusted axially, until the rate of gradation in the standard beam matches that of the sensitometric strip. The first adjustment of the wedge is made approximately, and then the overall average intensities of the two portions of the viewing field 24 are matched as accurately as possible, either by adjusting the rheostat 92, adjusting the rheostat 93 or adjusting the pile of plates 51 by screws 91 provided therefor. The final adjustment of the wedge 81 for the determination of rate of gradation, is then easily made since the two portions of the field match completely, except possibly at the toe or shoulder of the characteristic curve of the sensitometric strip 50. If the regions of the sensitometric strip 50 being measured, are selected so as to include neither the toe nor the shoulder, the match should be accurately uniform over the whole of the viewing field 24.

Fig. 7 illustrates a sensitometer for making the sensitometric strips of the type used in the preferred forms of the above gamma meters and speed meters. In this figure a light source 100 sends light through a shutter 101 and a ground glass 102 to a diffusing sheet 105. The inner surfaces 104 of the housing 103 are also made diffusing to insure uniformity of illumination on the surface 105. This light is transmitted through a density wedge 106 and a pile 107 of integrating plates; the end of each plate being provided with a diffusing surface 108. The plates are preferably made from a sheet of plate glass, and separated by sheets of black paper. The sensitive material as indicated by broken lines 109 is held against the end of the integrating pile, by a platen 110 hinged at the point 111. Then the shutter 101 is operated exposing the strip 109 which is processed in whatever manner is specified in the test being made.

This pile 107 of integrating plates thus serves the same purpose as it does in the preferred embodiment of gamma meter above described which requires a light beam of accurately graded intensity.

An end view of the plates is shown in Fig. 8, the density corresponding to each plate being written thereon. Since it is sometimes desirable both in sensitometers when exposing plates and in speed meters or gamma meters, when measuring sensitometric strips, to have steps in density intermediate to those shown in Fig. 8, alternative arrangements are shown in Figs. 9 and 10. In Fig. 9 a neutral density 112 is placed over a portion of each plate adding a density of .15 to each portion. In Fig. 10 the pile of plates has been cut across the grain and one part of the pile is shifted relative to the other part by the width of one-half of one plate. Due to the combination of the pile of plates with the continuous density wedge 106, this gives the effective densities shown on the pile 113. The densities marked in these Figs. 8, 9, and 10 are neither accurately computed nor selected for any reason other than purposes of illustration.

Fig. 11 shows an alternative form of the arrangement shown in Fig. 7 in which the shutter 101 is replaced by a pendulum type shutter consisting of an aperture 120 in front of the lamp 100 and an aperture 121 carried by a circular plate 122 to sweep past the aperture 120 when the exposure is to be made. The rotation of the plate 122 is about an axle 123 and is provided by a pendulum 124 mounted on the plate 122 and carrying an adjustable weight 125 fastened in place by a setscrew 126. When the plate 122 is rotated until the pendulum 124 is in the position shown by the dotted line 134, this pendulum 124 is engaged by a detent 130.

A handle 131 extending outside of the housing for the plate 122 operates this detent 130 releasing it when an exposure is to be made. At this time the plate and pendulum rotate around the axis 123 sweeping the aperture 121 past the aperture 120 and the rotation is continued until the pendulum 124 snaps into a second detent 132 similarly provided with an operating handle 133 extending through the housing for the plate 122.

After the exposure has been made, the shutter may be reset by rotating the plate and pendulum further in the same direction until the pendulum 124 engages the detent 130 as in the starting position. This additional rotation may be produced by tipping the instrument slightly or preferably by a crank on the hub 123 extending through the instrument housing.

In Fig. 12, a small source of light 33 is rigidly mounted at one end of a pair of guide rails 150, the other end of which carries a receptacle 151 for a continuously graded sensitometer strip 20. A continuously graded density wedge 152 is carried by a mount 153 axially adjustable on the rails 150 between the source 33 and the field of view in which the sensitometric strip 20 is mounted. The wedge and strip have their gradations optically in opposite directions. The density wedge 152, which for clarity is shown as a physical wedge, is adjusted until the eye 25 sees a uniform overall brightness of the strip 20, at which time the gradation of intensity of the incident light thereon matches that of the strip 20. The gamma of the strip may be read directly by a pointer 154 (carried by the mount 153) against a scale 155 on a rail 150.

In Fig. 13 the viewing field 160 is in two parts, one illuminated through the sensitometer strip and the other through the standard wedge which may be identical in form. A shield 161 prevents light intended for one portion of the field 160 reaching the other portion. A diffusing sheet 162 is mounted in front of one portion and the axially adjustable mount 153 is carried on rails 163 in front of the other portion. The device may be used in either of two ways. If the standard wedge has a high gamma it is placed at 165 on the adjustable mount 153 and the test strip is placed at 164. If the standard wedge has low gamma it is placed at 164 and the test strip is carried by the mount 156. If the diffuser 162 were omitted both could be spaced from the viewing field 160 and both could even be adjustable but obviously this is of little practical value. The scale 155 is calibrated to give the ratio between the two gammas or if the standard wedge is specifically mounted in one of the alternative positions 164 or 165 the scale is calibrated to give the gamma of the sensitometric strip directly.

A preferred form of the invention shown in Fig. 14 differs from Fig. 13 by the inclusion of a pile 166 of integrating plates in front of the standard wedge 168 which is the adjustable one in this case. This embodiment is employed with a stepped sensitometric strip 50 mounted in a receptacle 167.

Similarly Fig. 15 shows the preferred form of the invention corresponding to Fig. 12; although any of the last four figures may be modified as discussed in connection with Figs. 1 to 6 so as to be useful as a speed indicator, they are most useful merely as simple gamma meters.

In those embodiments intended for measuring film speed, various arrangements of the speed scale are possible. The specific arrangement shown in Fig. 5 actually indicates density at one step of the sensitometer strip. This is not one of the factors usually employed for speed designation and the correspondence between density and inertia speed, for example, would depend on the gamma.

If the transverse motion of the wedge carries the light source with it or if the sensitometer strip and pile are shifted, (for example, in steps with minor adjustments for part steps as in Fig. 6), the amount of shift is a measure of the log exposure change as required in ordinary speed measurements. In this case the only dependence on gamma is that the log exposure change is effectively measured at that particular density corresponding to intensity at the viewing field which does not vary as the wedge is moved longitudinally, i. e. the density which gives constant brightness on the pile of plates. For inertia speed measurements, the longitudinal sliding of the wedge should be parallel to a line from the light source through the zero density edge of the wedge. If this line is to be perpendicular to the end of the pile of plates, the light source should be higher than it is shown in Figs. 3 and 5, for example.

Instead of moving either the wedge and light source or the strip and pile, the same effect can be obtained by moving the wedge only provided the scale is arranged as shown in Fig. 16 or 18.

In Fig. 16 the wedge 32 does not carry a pointer such as 77 in Fig. 5, but by a member 172 with a pin 173 extending through a slot 171 the wedge rotates a lever 170 about a fulcrum 174. The outer end of the lever 170 carries a pointer 175 reading on a scale 176. Since the pivot 174 is in the plane of the light source 33 and the scale 176 is in the plane of the front surface of the pile 51, the scale reading corresponds to density divided by gamma which corresponds to log exposure change as required. Thus the lever brings in gamma as a factor so that at lower gammas, the same transverse shift of the wedge 32 causes a greater change in scale reading.

Since a line 177 from the source 33 parallel to the lever 170 always passes through the same point of the wedge 32, all speed measurements are at this density. This is illustrated in Fig. 17 showing four characteristic curves at different speeds and gammas. The solid line curves correspond to the wedge 32 as shown in solid lines in Fig. 16, the broken line curves correspond to the position of wedge 32' as shown by broken lines. With the pointer 175 at the position shown, the line 177 passes through the IV step or plate of the pile 51 and hence this plate has substantially the same density for both positions of the wedge. Thus, the two curves intersecting at the point 182 give the same reading of speed on scale 176. Similarly if two strips of different gammas gave the same but higher reading on the scale 176 the corresponding curves would intersect at the point 183.

Both points 182 and 183 have the same density which is the density of the wedge at the point where the line 177 intersects it. Thus the speed measurements are log E measurements at constant density. If this density is one, the speed is "astronomical speed"; if the density is zero or more exactly is fog density, the speed is "inertia speed." To have the density zero, the source 33 would have to be nearer the point 174 or the pivot would have to be lowered to the point 180 as shown by broken lines. With the member 172 of the same length, the line 181, parallel to the lever in the position shown by broken lines, would pass through the zero density edge of the wedge 32.

Fig. 18 corresponds to a plan view of Fig. 5 and shows an optical lever in place of the mechanical lever 170 of Fig. 16. Light from the source 57 is reflected by a mirror 185 past a pointer 187 carried by a mount 70 for the wedge 32, so that a shadow of this pointer 187 falls on a scale 186 effectively at the receiving plane 188 of the pile 51. The offset of the mirror 185 to permit light from the source 57 to pass the mirror 59 is such that the pointer 187 has to be set back from the plane of the wedge and scale 186 has to be set back from the plane 188.

For astronomical speed, the pointer 187 should be adjacent to a density of one on the wedge and for inertia speed it should be adjacent to the zero density edge of the wedge. The source 57 or the virtual image of it in the mirror 185 is effectively the pivot for the optical lever and additional optical elements or a separate source may be included if a sharper shadow of the pointer 187 is desired.

Another method of varying gamma when the pile of integrating plates is narrow is to rotate the wedge in front of the pile as described by Oran Miller in copending application Serial Number 445,877 filed June 5, 1942.

Having thus described various embodiments of my invention I wish to point out that it is not limited to the specific structures shown but is of the scope of the appended claims.

What I claim and desire to secure by Letters Patent of the United States is:

1. A gamma meter comprising means for defining a viewing field, means for illuminating at least a portion of said field by light from a sensitometric strip of graded density, means for illuminating at least a portion of said field by a standard light beam of graded intensity, the latter illuminating means including a small source of light and a density wedge in front of the source and axially adjustable to vary the rate of gradation of the intensity of said beam and scale means coupled to the wedge for indicating the gamma of the strip when said rate is adjusted to match that of the strip density.

2. A gamma meter according to claim 1 in which the two portions of the field are adjacent to one another and the wedge and strip are oriented in the same direction optically.

3. A gamma meter according to claim 1 in which the two portions of the field are the same and the wedge and strip are oriented in optically opposite directions.

4. A gamma meter according to claim 1 in which the two portions of the field are the same and the wedge and strip are oriented in optically opposite directions and in which means are provided for illuminating an adjacent portion of the field with light of uniform intensity.

5. A combination gamma meter and photographic speed meter comprising means for defining a viewing field, means for illuminating at least a portion of said field by light from a sensitometric strip of graded density, means for iluminating at least a portion of said field by a standard light beam of graded intensity, the latter illuminating means including a small source of light and a density wedge in front of the source and axially adjustable to vary the rate of gradation of the intensity of said beam and scale means coupled to the wedge for indicating the gamma of the strip when said rate is adjusted to match that of the strip density, means for varying the relative average intensity of the light on the two portions and additional scale means for indicating the adjustment of the varying means.

6. A combination gamma meter and photographic speed meter comprising means for defining a viewing field, means for illuminating at least a portion of said field by light from a sensitometric strip of graded density, means for illuminating at least a portion of said field by a standard light beam of graded intensity, the latter illuminating means including a small source of light and a density wedge in front of the source and axially adjustable to vary the rate of gradation of the intensity of said beam and scale means coupled to the wedge for indicating the gamma of the strip when said rate is adjusted to match that of the strip density, the strip and wedge being adjustable relative to one another and transversely with respect to the field and additional scale means for indicating the relative adjustment.

7. A combination gamma meter and photographic speed meter according to claim 5 in which the two portions of the field are adjacent to one another, the wedge and strip are oriented in the same direction optically and the additional scale means indicates the adjustment in terms of photographic speed when the average intensities of said two portions are the same.

8. A combination gamma meter and photographic speed meter comprising means for defining a viewing field, means for illuminating at least a portion of said field by light from a sensitometric strip of graded density, means for illuminating at least a portion of said field by a standard light beam of graded intensity, the latter illuminating means including a small source of light and a density wedge in front of the source and axially adjustable to vary the rate of gradation of the intensity of said beam and scale means coupled to the wedge indicating the gamma of the strip when said rate is adjusted to match that of the strip density, the two portions of the field being superposed and the same, the wedge and strip being oriented in optically opposite directions, means for illuminating an adjacent portion of the field uniformly, means for varying the relative intensities of the superposed portions and the adjacent portion and additional scale means coupled to the varying means for indicating the photographic speed of the strip when the relative intensities are equal.

9. A combination gamma meter and photographic speed meter according to claim 5 in which the intensity varying means consists of means for moving the wedge transversely relative to the light therethrough and along the direction of density gradation.

10. A combination gamma meter and photographic speed meter according to claim 5 in which the intensity varying means includes grooves for holding the strip adjustable transversely relative to the light therethrough and along the direction of density gradation.

11. A gamma meter according to claim 1 for use with sensitometric strips in which the density is graded in steps and comprising between the wedge and the field a pile of integrating plates whose thicknesses equal the widths of the corresponding strip steps.

12. A gamma meter according to claim 1 for use with sensitometric strips in which the density is graded in steps, the two portions of the field being adjacent to one another and the wedge and strip being oriented in the same direction optically and comprising between the wedge and the field a pile of integrating plates whose thicknesses equal the widths of the corresponding strip steps and means for varying the relative average intensity of the light on the two portions continuously.

13. A combination gamma meter and speedmeter according to claim 5 for use with sensitometric strips in which the density is graded in steps and comprising between the wedge and the field a pile of integrating plates whose thicknesses equal the widths of the corresponding strip steps.

14. A combination gamma meter and speedmeter according to claim 5 for use with sensitometric strips in which the density is graded in steps and comprising between the wedge and the field a pile of integrating plates whose thicknesses equal the widths of the corresponding strip steps and in which the intensity varying means consists of means for moving the wedge transversely relative to the light therethrough and along the direction of density gradation.

15. A combination gamma meter and speedmeter according to claim 5 for use with sensitometric strips in which the density is graded in steps and comprising between the wedge and the field a pile of integrating plates whose thicknesses equal the width of the corresponding strip steps and in which the intensity varying means includes grooves for holding the strip adjustable transversely relative to the light therethrough and along the direction of gradation.

16. In sensitometric apparatus for which the sensitometric strip has density graded in steps, means for producing a light beam with accurately graded intensity thereacross comprising a light source, a pile of integrating plates of solid transparent material and between the source and the pile, a light filter of continuously graded density.

17. Light beam producing means according to claim 16 in which the pile is in two parts one part being shifted relative to the other by half the thickness of one plate.

18. Light beam producing means according to claim 16 in which an additional light filter is included adjacent to the pile covering a portion of each plate, the density of the filter being equal to one-half the logarithm of the ratio between intensities of consecutive steps in said light beam.

19. Light beam producing means according to claim 16 in which means are provided for axially adjusting the light filter to vary the rate of gradation of intensity across said beam.

20. A gamma meter comprising means for defining a viewing field, means for illuminating at least a portion of said field by light from a sensitometric strip of continuously graded density, means for illuminating at least a portion of said field by a standard light beam of continuously graded intensity from a standard continuously graded density wedge, at least one of said illuminating means being a small source of light illuminating one of the two graded density elements, means for axially adjusting said one of the two in front of the light source to vary the rate of gradation of the intensity of the corresponding field portion and scale means on the adjusting means for indicating the gamma of the strip when said rate is adjusted to match that of the other field portion.

21. In a gamma meter, means for producing at a viewing field a light beam with graded intensity thereacross and with variable rate of the gradation comprising a small light source illuminating the field, a light filter of continuously graded density between the source and the field, means engaging the filter for axially adjusting it between the source and the field and scale means on the adjusting means for indicating the rate of gradation of intensity at the viewing field.

22. Light beam producing means according to claim 21 in which a pile of integrating plates is mounted close to the viewing field between it and the filter.

JOHN G. CAPSTAFF.